(12) United States Patent
Li et al.

(10) Patent No.: US 10,482,499 B2
(45) Date of Patent: Nov. 19, 2019

(54) METHOD FOR CONDUCTING A TRANSACTION

(71) Applicant: Mastercard Asia Pacific Pte. Ltd., Singapore (SG)

(72) Inventors: Jiaming Li, Singapore (SG); Donghao Huang, Singapore (SG); Jie Zhang, Singapore (SG); Bensam Joyson, Singapore (SG); Douglas Tan, Singapore (SG); Yong How Chin, Singapore (SG)

(73) Assignee: Mastercard Asia Pacific Pte. Ltd., Singapore (SG)

( * ) Notice: Subject to any disclaimer, the term of this patent is extended or adjusted under 35 U.S.C. 154(b) by 383 days.

(21) Appl. No.: 14/788,081

(22) Filed: Jun. 30, 2015

(65) Prior Publication Data
US 2016/0005009 A1    Jan. 7, 2016

(30) Foreign Application Priority Data

Jul. 1, 2014    (SG) ............................ 10201403766Q

(51) Int. Cl.
| | |
|---|---|
| *G06Q 20/00* | (2012.01) |
| *G06Q 30/02* | (2012.01) |
| *G06Q 20/38* | (2012.01) |
| *G06Q 30/06* | (2012.01) |
| *G06Q 20/20* | (2012.01) |
| *G06Q 20/32* | (2012.01) |

(52) U.S. Cl.
CPC ......... *G06Q 30/0255* (2013.01); *G06Q 20/20* (2013.01); *G06Q 20/327* (2013.01); *G06Q 20/382* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 6,105,008 | A * | 8/2000 | Davis ..................... | G06Q 20/02 235/375 |
| 7,648,068 | B2 | 1/2010 | Silverbrook et al. | |
| 7,970,669 | B1 * | 6/2011 | Santos ................. | G06Q 10/087 235/379 |
| 8,423,420 | B1 * | 4/2013 | Bhosle .............. | G06Q 30/0607 705/26.1 |
| 2002/0133467 | A1 * | 9/2002 | Hobson .................. | G06Q 20/02 705/64 |
| 2003/0105725 | A1 * | 6/2003 | Hoffman ................. | G06F 21/32 705/75 |

(Continued)

*Primary Examiner* — Rajesh Khattar
(74) *Attorney, Agent, or Firm* — Armstrong Teasdale LLP

(57) ABSTRACT

A method for conducting a transaction between a merchant and a customer, a merchant device, and a computer storage medium for instructing a computing device to execute a method for conducting a transaction between a merchant and a customer are disclosed. The method includes establishing a secure wireless connection between a merchant device and a customer device, real-time synchronizing, via the secure connection, a shopping cart of the customer between the merchant and the customer devices, determining, via the secure connection, at least one payment option for checking out the shopping cart, and processing, at a transaction processing device, the payment based on a selected payment option out of the at least one payment option.

15 Claims, 12 Drawing Sheets

(56) References Cited

U.S. PATENT DOCUMENTS

| | | | |
|---|---|---|---|
| 2006/0242026 A1* | 10/2006 | Crespo | G06Q 20/02 |
| | | | 705/26.8 |
| 2012/0158584 A1* | 6/2012 | Behren | G06Q 20/10 |
| | | | 705/41 |
| 2012/0232981 A1 | 9/2012 | Torossian et al. | |
| 2013/0332251 A1* | 12/2013 | Ioannidis | G06Q 20/3224 |
| | | | 705/14.23 |
| 2014/0101036 A1 | 4/2014 | Phillips et al. | |
| 2014/0316991 A1* | 10/2014 | Moshal | G06F 17/30879 |
| | | | 705/64 |
| 2015/0039468 A1 | 2/2015 | Spitz et al. | |
| 2015/0088756 A1* | 3/2015 | Makhotin | G06Q 20/3829 |
| | | | 705/71 |
| 2015/0095238 A1* | 4/2015 | Khan | G06Q 20/325 |
| | | | 705/71 |
| 2015/0100447 A1* | 4/2015 | Bohbot | G06Q 30/08 |
| | | | 705/26.3 |
| 2015/0371226 A1* | 12/2015 | Hurley | G06Q 20/40 |
| | | | 705/64 |

* cited by examiner

METHOD FOR CONDUCTING A TRANSACTION

CROSS REFERENCE TO RELATED APPLICATIONS

This application claims the benefit of SG Patent Application No. 10201403766Q filed Jul. 1, 2014, which is hereby incorporated by reference in its entirety.

BACKGROUND OF THE DISCLOSURE

The present invention relates generally to a method for conducting a transaction between a merchant and a customer.

Many transactions in the retail and hospitality industries are conducted using point of sale (POS) terminals. Each POS terminal typically includes input devices (such as a keyboard, a scanner, a touch panel, etc.), sensors (such as a weighing machine, a radio frequency identification (RFID) sensor, etc.), output devices (such as a display, a printer, etc.), card readers, and various networking equipment.

In the hospitality industry, for example, restaurants, cafes and bars, a POS terminal may be integrated with wireless order-taking devices, which allow a customer or service personnel to input items that the customer wishes to order. The wireless order-taking devices are usually connected to other components of the same POS system via Wi-Fi. Orders which are taken are sent to the kitchen for preparation, as well as to the POS terminal where the customer can make payment when checking out. However, it has been noted that the process of checking out can be manual and cumbersome, and the customer may need to wait in line for his/her turn before making payment, or wait at the table while the payment is being processed and receipt printed.

In the retail industry, checking out a basket of goods can be similarly tedious, especially if vouchers, loyalty discounts, volume discounts, etc. are used. Furthermore, a customer routinely may not be aware of the promotional schemes that are available for his/her purchases.

Moreover, during the check-out process, customers typically have no chance to check their purchase line items in real-time. They can only verify their purchase after making the payment and getting a receipt from the merchant.

A need therefore exists to provide a method for conducting a transaction between a merchant and a customer that seeks to address at least some of the above problems.

BRIEF DESCRIPTION OF THE DISCLOSURE

According to a first aspect, there is provided a method for conducting a transaction between a merchant and a customer. The method includes establishing a secure wireless connection between a merchant device and a customer device, synchronizing, via the secure connection, a shopping cart of the customer between the merchant and the customer devices, determining, via the secure connection, at least one payment option for checking out the shopping cart, and processing, at a transaction processing device, the payment based on a selected payment option out of the at least one payment option.

The secure wireless connection may include a Bluetooth low energy connection.

The step of establishing the secure wireless connection may include broadcasting, by the merchant device, information relating to the merchant device, receiving, at the customer device, the information broadcasted by the merchant device, and upon receiving a connection request from the customer device, the merchant and customer devices automatically exchanging an encryption key to build a secure channel.

The method may further include processing a check-in request sent from the client device.

The step of processing the check-in request may include receiving at least one of an alphanumeric string, a sound, an icon, and a picture associated with the customer.

The step of processing the log-in request may include bringing the customer device proximate the merchant device.

The step of processing the log-in request may further include sending, from the merchant device, a query to the customer device, receiving, at the customer device, the query, and generating a reply for sending to the merchant device, and verifying the customer profile based on the reply to the query received from the customer device.

The step of broadcasting may include a plurality of merchant devices simultaneously broadcasting information relating to respective merchant devices.

The step of synchronizing the shopping cart may include synchronization of the whole shopping cart.

The step of synchronizing the shopping cart may include incremental synchronization of the shopping cart from the merchant device.

The step of synchronizing the shopping cart may include incremental synchronization of the shopping cart from the customer device.

Incremental synchronization of the shopping cart from the customer device may include updating the shopping cart based on a selected loyalty scheme.

The step of synchronizing the shopping cart may further include broadcasting promotional information from the merchant device to the customer device.

The promotional information may be specific to the customer.

The payment options may include any one of the following: payment in cloud, tokenized payment and payment by an EMV enabled chip.

The step of processing the payment may include communicating with an off-site transaction processing device.

According to a second aspect, there is provided a merchant device configured to operate as the merchant device of the method of the first aspect.

According to a third aspect, there is provided a computer storage medium having stored thereon computer code means to instruct a computing device to execute a method for conducting a transaction between a merchant and a customer. The method includes establishing a secure wireless connection between a merchant device and a customer device, synchronizing, via the secure connection, a shopping cart of the customer between the merchant and the customer devices, determining, via the secure connection, at least one payment option for checking out the shopping cart, and processing, at a transaction processing device, the payment based on a selected payment option out of the at least one payment option.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION OF THE DISCLOSURE

Figure 1:
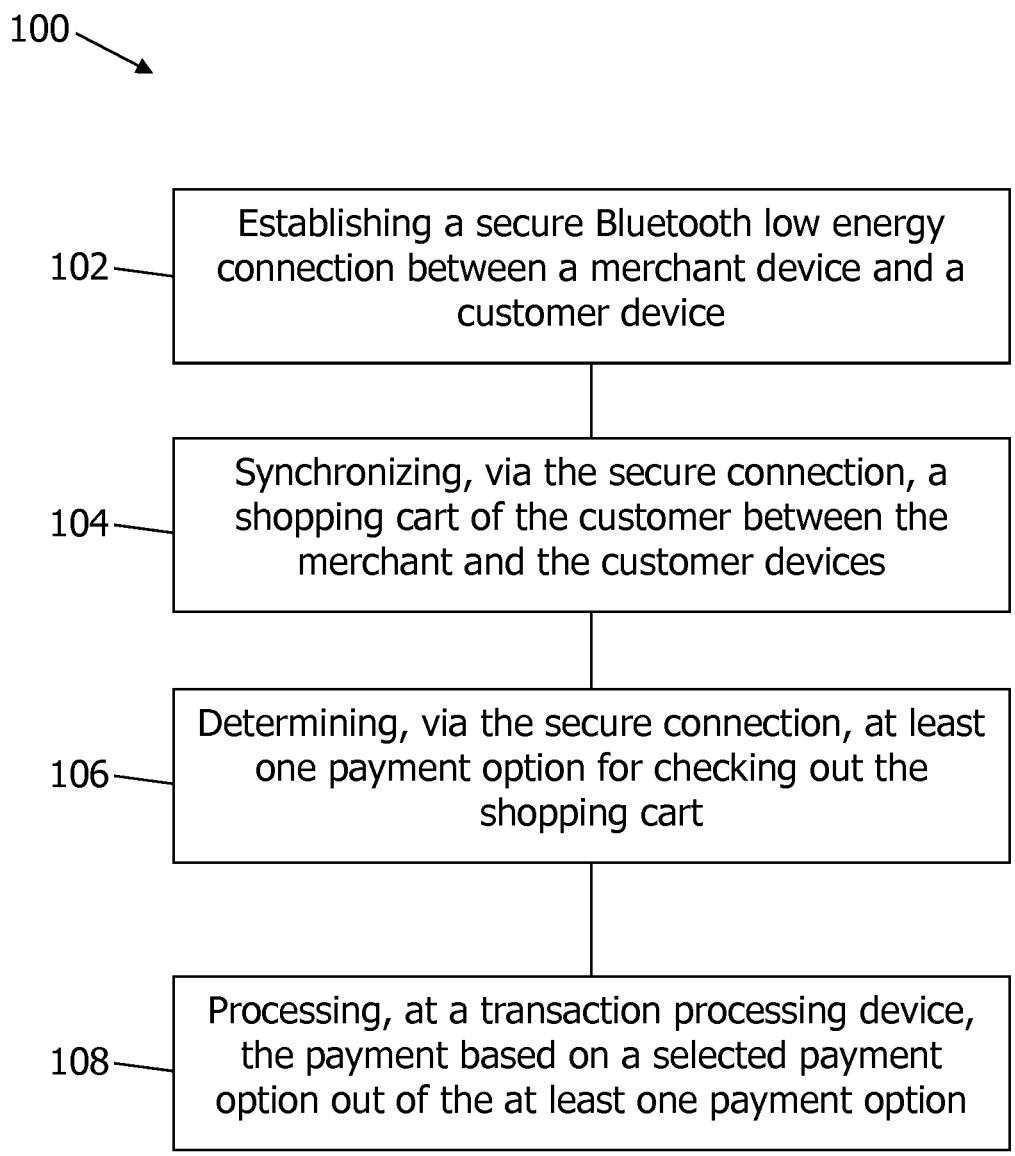
FIG. 1 shows a flow chart illustrating a method for conducting a transaction between a merchant and a customer according to an example embodiment.

FIG. 1 shows a flow chart 100 illustrating a method for conducting a transaction between a merchant and a customer according to an example embodiment. At step 102, a secure wireless connection, for example a Bluetooth low energy connection, or a Wi-Fi connection, between a merchant device and a customer device is established. At step 104, a shopping cart of the customer is synchronized, via the secure connection, between the merchant and the customer devices. At step 106, at least one payment option for checking out the shopping cart is determined via the secure connection. At step 108, the payment is processed based on a selected payment option out of the at least one payment option.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. In some embodiments, the construction of a specialized apparatus to perform the required method steps may be appropriate.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the example method.

Figure 2:
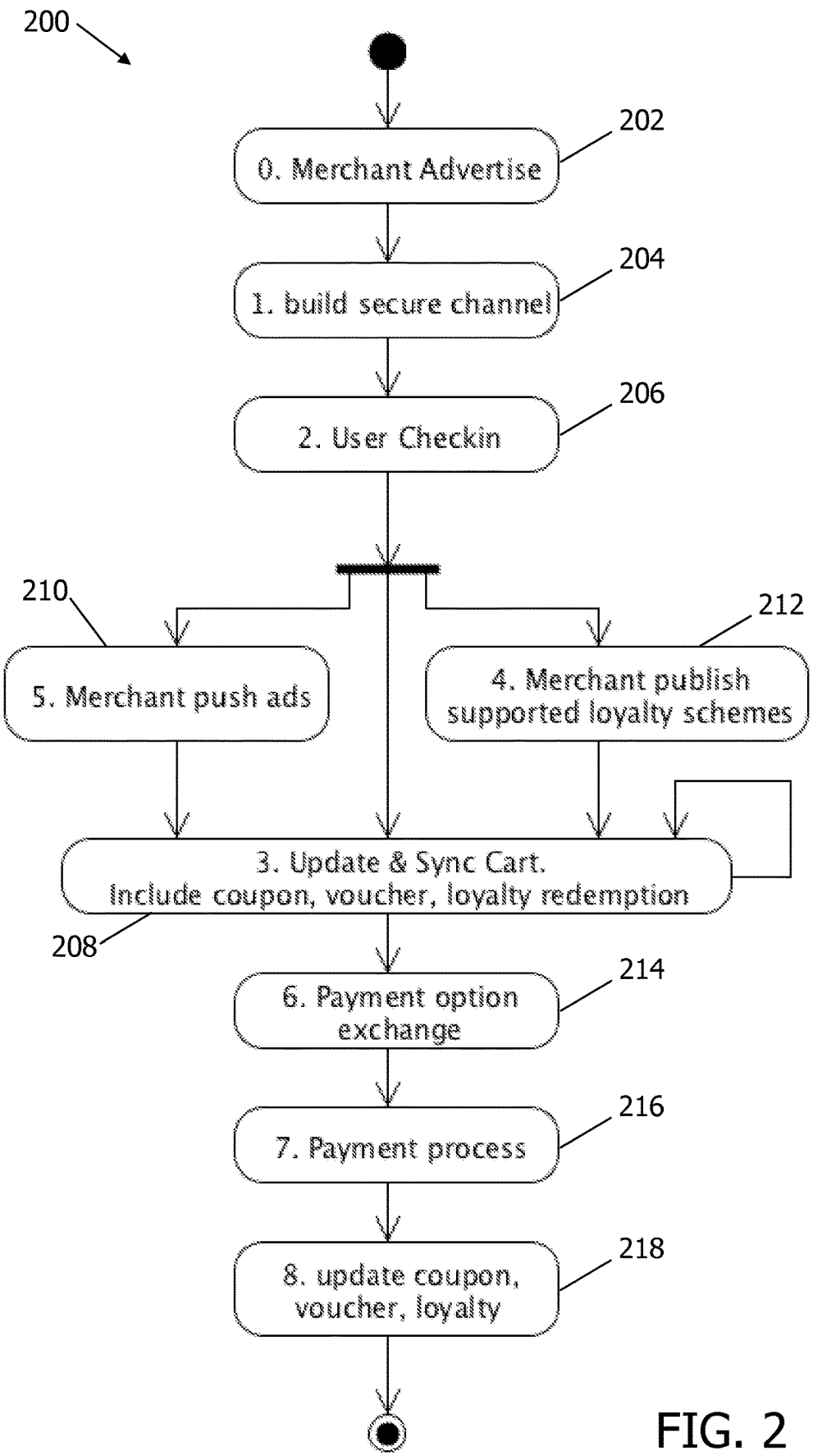
FIG. 2 shows a flow chart illustrating an example implementation of the method of FIG. 1.

FIG. 2 shows a flow chart 200 illustrating an example implementation of the method of FIG. 1. Here, the merchant operates a merchant device, e.g. a POS terminal in the form of a Bluetooth-enabled desktop, laptop or tablet computer, while the customer uses a customer device, e.g. a Bluetooth-enabled mobile phone or tablet computer. At step 202, the merchant device advertises or broadcasts its name via Bluetooth low energy so that the customer device can identify and connect to it. At step 204, a secure Bluetooth low energy channel is built between the merchant device and the customer device. At step 206, the customer, who has items to be checked out, performs a check-in to the merchant device.

To initiate the check-out process, at step 208, the merchant enters details of the items in the cart into the merchant device, and the cart information is synchronised between the merchant device and the customer device. During or prior to the check-out, at step 210, the merchant device can send advertisements and promotions to the customer device, and the customer can add these promotional items to the cart. Also, at step 212, the merchant device can send supported loyalty schemes, e.g. as bonus items, to the customer device, and the customer can redeem the loyalty points, e.g. by adding the relevant bonus items to the cart. The cart is then updated, if necessary, to take into account the coupons, vouchers, promotions, loyalty points, etc. that have been used in steps 210 and 212.

Once the cart is ready for payment, at step 214, the merchant device and the customer device exchange information to determine the available payment options. For credit card or electronic payment, if there are several payment channels, e.g. a direct request from the merchant device to a server or payment gateway, or an indirect request via the merchant device, the merchant can decide on the payment channel to be used. At step 216, the payment request is processed and the merchant device informs the customer device when the payment is completed. At step 218, the merchant device updates the customer device, if necessary, with coupon, voucher, and loyalty information resulting from the transaction.

With reference to FIGS. 3-10, the method for conducting a transaction between a merchant and a customer in FIG. 2 is discussed in detail.

Figure 3:
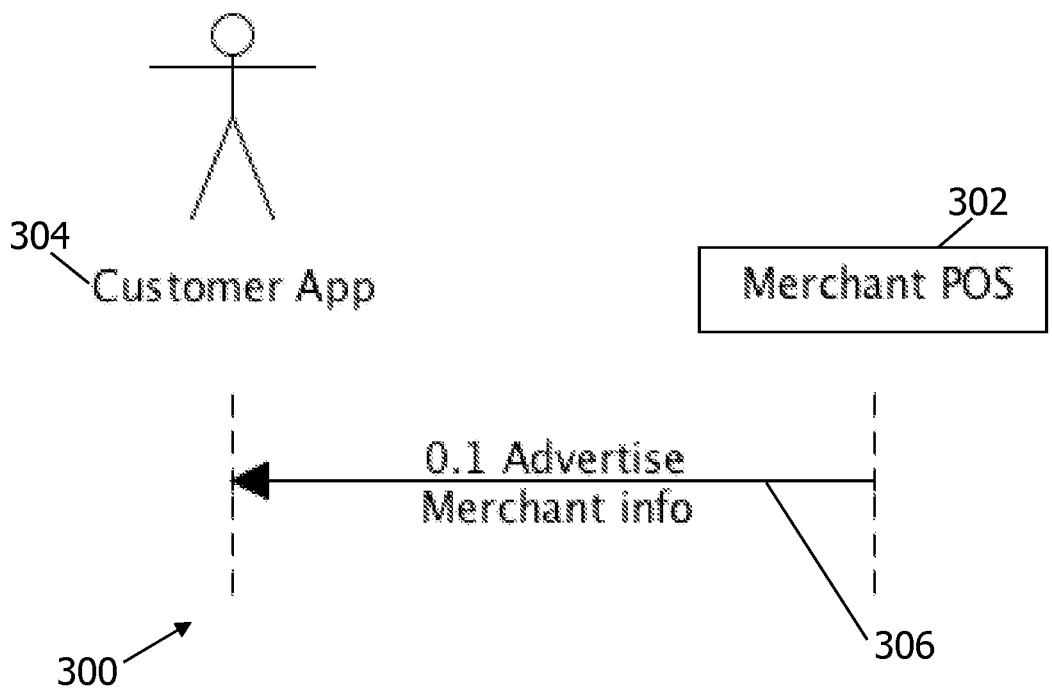
FIG. 3 shows a schematic diagram illustrating flow of information in the broadcasting step in FIG. 2.

FIG. 3 shows a schematic diagram 300 illustrating flow of information in the broadcasting step (step 202) in FIG. 2. For Bluetooth communication between a merchant device 302 and a customer device 304, the customer device 304 typically acts as a Bluetooth central device, while the merchant device 302 (shown in FIG. 3 as merchant POS) acts as a Bluetooth peripheral device. For example, the merchant device 302 runs on iOS operating system (developed by Apple Inc.), and the customer device runs on iOS operating system, or Android operating system (developed by Google Inc.), or the like. The information broadcasted by the merchant device, as represented by arrow 306 in FIG. 3, may be associated with or indicative of the merchant and/or the merchant device, such as the name of the merchant where there are multiple merchants nearby, or the name of the counter, e.g. Supermarket X Counter Y, where there are multiple adjacent check-out counters of the same merchant.

Figure 4:
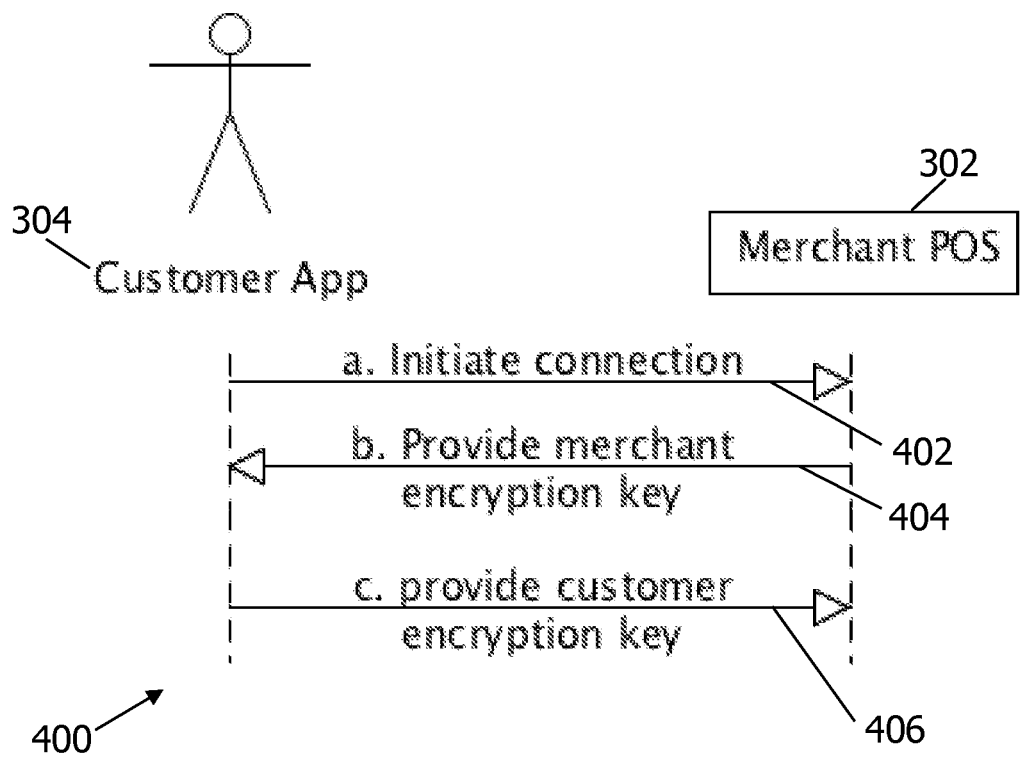
FIG. 4 shows a schematic diagram illustrating flow of information in the connection step in FIG. 2.

The customer device 304 can detect and display a list of merchant devices which are in range, and connect to these devices, for example, prior to the customer checking out. FIG. 4 shows a schematic diagram 400 illustrating flow of information in the connection step (step 204) in FIG. 2 between the customer device 304 and merchant device 302. Typically, the customer device 304 initiates the connection, as represented by arrow 402 in FIG. 4. The merchant device 302 and customer device 304 then exchange encryption keys to build a secure channel, as represented by arrows 404, 406 respectively, in a process also known as pairing. These exchanges can take place automatically in the background without an input or command from the merchant or the customer, and without actually sending information about the customer at this point. It is possible that the customer device 304 may build multiple secure Bluetooth low energy channels with respective available merchant devices.

Figure 5:
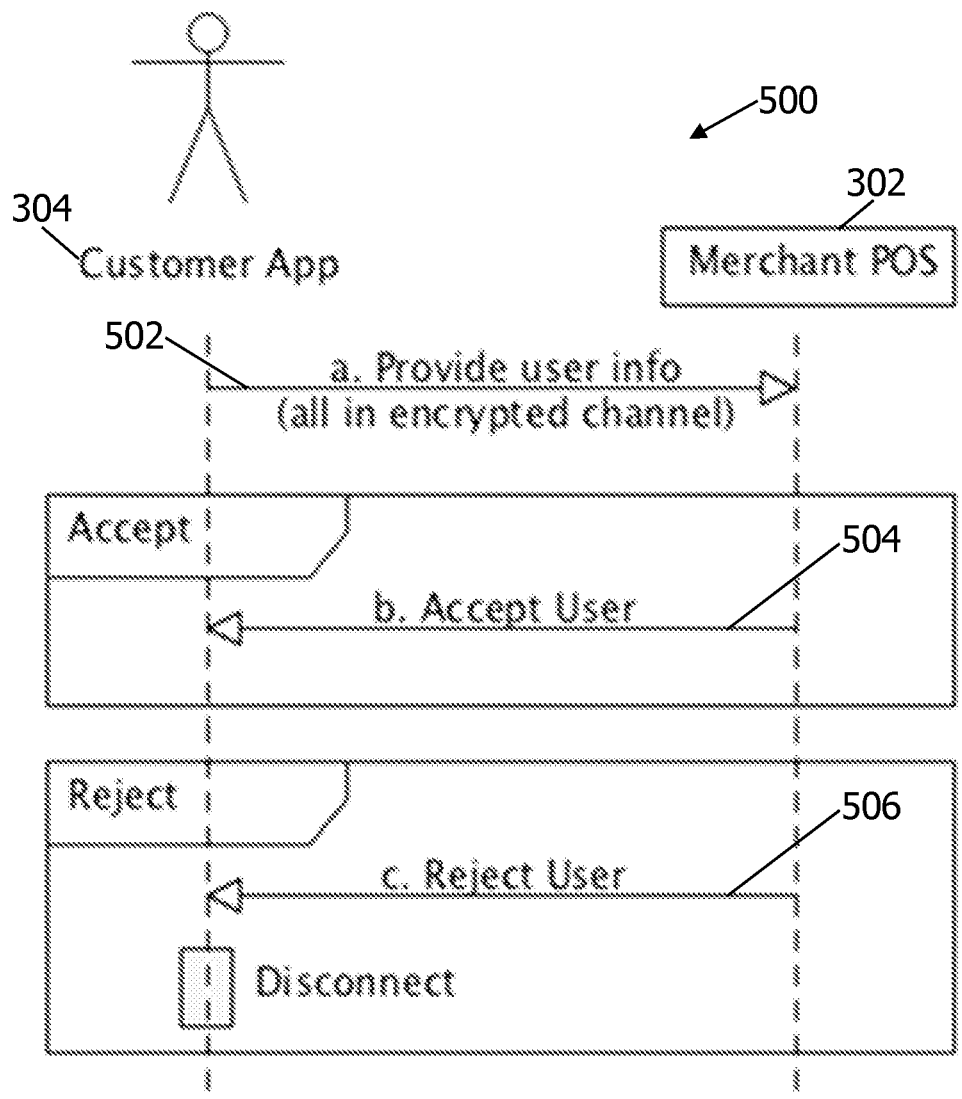
FIG. 5 shows a schematic diagram illustrating flow of information in the check-in step in FIG. 2.

Next, the customer may check-in or log-in to a desired merchant device where he wishes to check out his items, which can be goods or services at a store, or food orders at a restaurant, etc. FIG. 5 shows a schematic diagram 500 illustrating flow of information in the check-in step (step 206) in FIG. 2. As can be seen in FIG. 5, a request is made by the customer device 304 via the secure channel, as shown by arrow 502. In one check-in mode, the customer can command the customer device 304 to send to the merchant device 302 a request via the secure Bluetooth connection with information including, but is not limited to, an alphanumeric string, a sound, an icon, and a picture associated with the customer. For example, the request contains a username and/or display photo that is identifiable with the customer. In another check-in mode, the customer device 304 can use a proximity indicator, such as signal strength from the Bluetooth signal, or a near field communication (NFC) signal, provided by compatible devices to detect the distance to the merchant device 302. Based on predefined criteria, e.g. proximate distance between the customer and merchant devices, the customer device 304 can perform the check-in request automatically.

The merchant, having received the check-in request from the customer, may accept the request (as represented by arrow 504), or reject the request (as represented by arrow 506). An example pop-up message "User ABC wishes to check out the current cart. Accept? Reject?" may appear on the merchant device 302. If the request is accepted, i.e. the check-in is successful, the merchant device 302 may optionally query an application or program running in the customer device 304 (e.g. a virtual wallet app) for further information, such as the loyalty schemes available through the customer device 304. If the request is rejected, i.e. the check-in is unsuccessful, the customer can terminate the connection between the merchant and customer devices.

Figure 6:
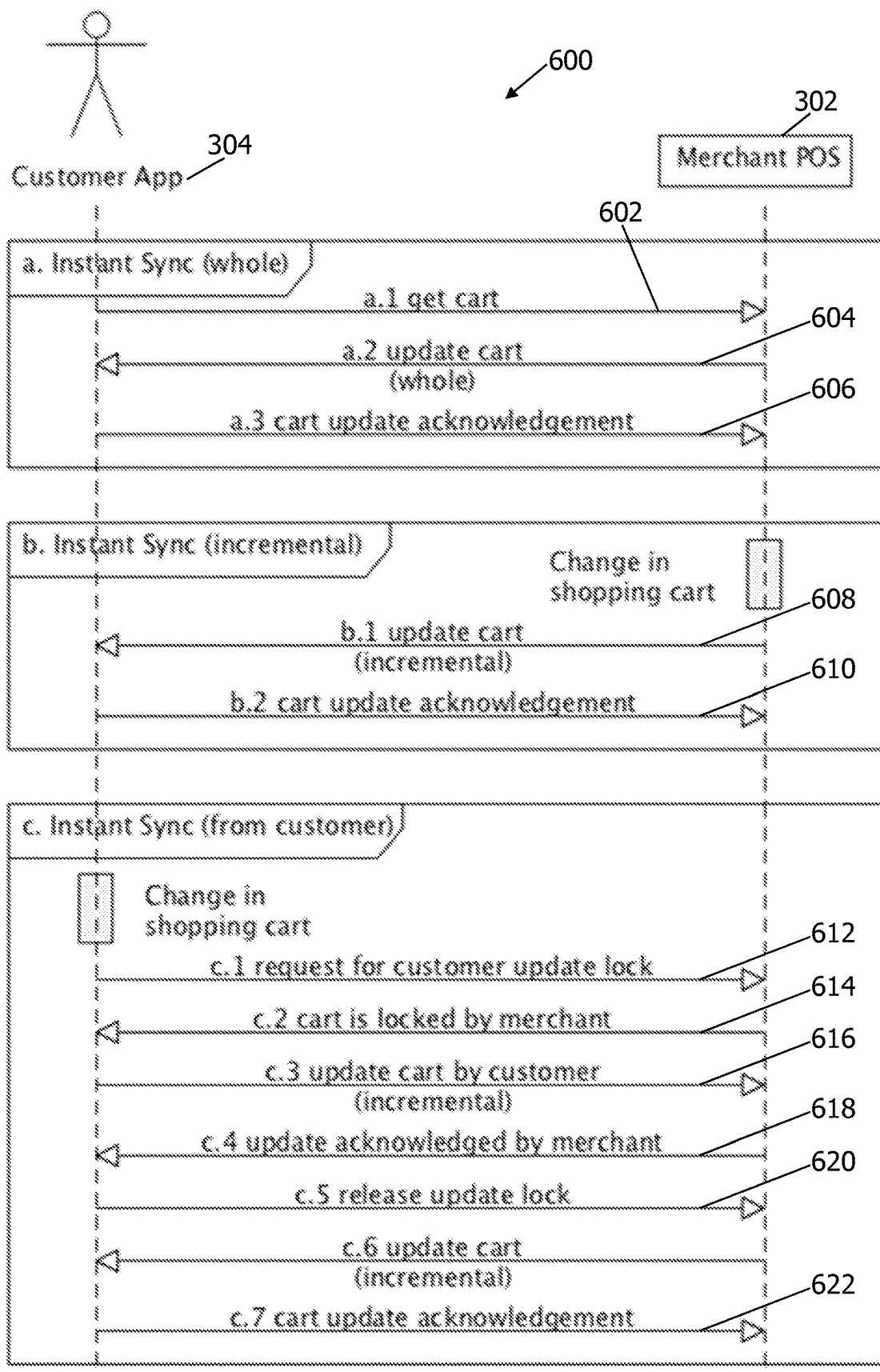
FIG. 6 shows a schematic diagram illustrating flow of information in the synchronisation step in FIG. 2.

During the check-out process, the merchant enters the items to be checked out, and the cart information including e.g. item names, quantities, prices, descriptions, etc., is synchronised between the merchant and customer devices. FIG. 6 shows a schematic diagram 600 illustrating flow of information in the synchronisation step (step 208) in FIG. 2. The synchronisation can be carried out for the whole cart at one time, or incremental updates can be made to the cart.

To instantly synchronize the whole cart, the customer device 304 sends a request to the merchant device 302 to get the cart information, as represented by arrow 602 in FIG. 6. The merchant device 302 then updates the customer device 304 with information of the whole cart, as represented by arrow 604. The customer device 304 sends a cart update acknowledgement after receiving the cart information, as represented by arrow 606. The exchange of cart information occurs in the background without an input or command from either the merchant or the customer.

An incremental update of the cart can be initiated from either the merchant device 302 or the customer device 304. For example, when there is a change in the shopping cart prompted by the merchant, the merchant device 302 sends a cart update to the customer device 304 (as represented by arrow 608), and the customer device 304 returns a cart update acknowledgement (as represented by arrow 610) after receiving the update. A typical occurrence is when there is a duplicate or erroneous entry of an item by the merchant which requires correction. This feature allows real-time update of the items being checked out, and the customer can check whether the items are correct.

Alternatively, when there is a change in the shopping cart, such as the addition or removal of certain items, the customer can inform the merchant by initiating an update. First, the customer device 304 sends a cart lock request to the merchant device 302, as represented by arrow 612, such that the merchant device 302 temporarily stops the real-time update described above. The merchant device 302 then informs the customer device 304 that the cart is locked, as represented by arrow 614. Next, the customer device 304 sends the incremental cart update to the merchant device 302 (as represented by arrow 616), and the merchant device 302 returns an acknowledgment (as represented by arrow 618). At this point, the customer device 304 confirms that the cart can be unlocked (as represented by arrow 620), and the merchant device 302 can resume the real-time update of the cart information (as represented by arrow 622).

The ability to initiate an update from the customer device 304, as described above, is particularly useful in situations where the customer changes his/her mind about a purchase. For example, he/she may realize at the point of check out that certain items were picked up impulsively and actually may not be required. Also, this feature allows the customer to redeem loyalty/bonus items by inserting them into the cart, or take advantage of promotions offered by the merchant, as described in more detail below with reference to FIG. 7.

Figure 7:
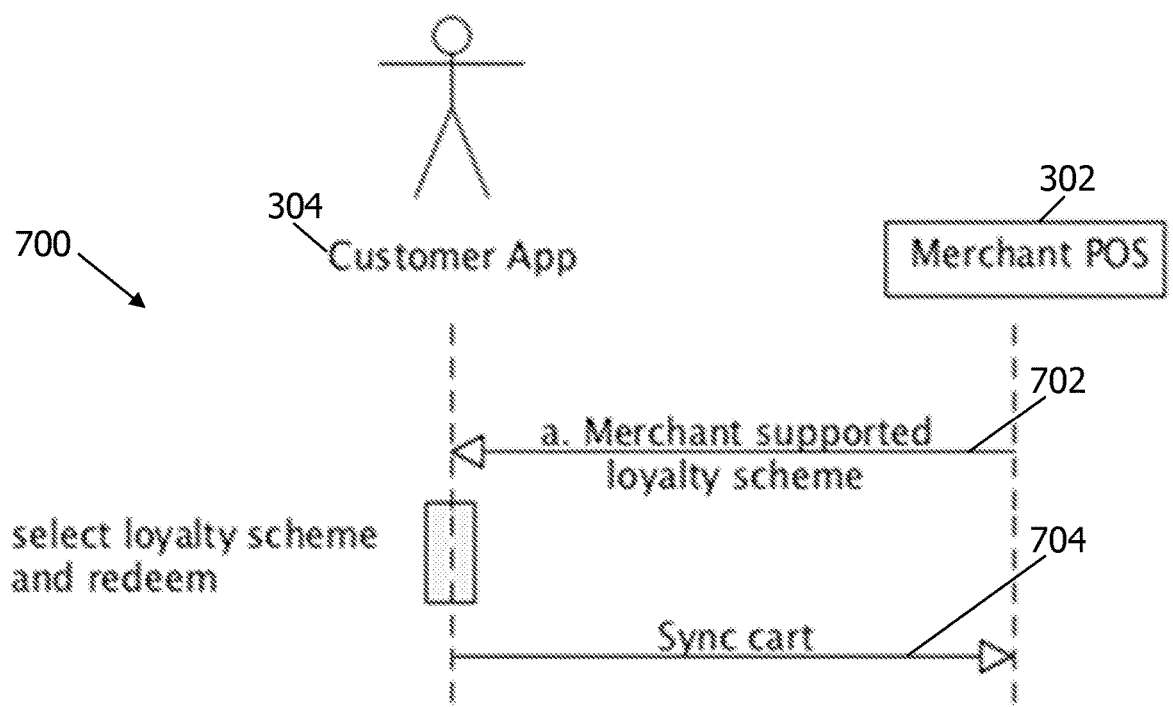
FIG. 7 shows a schematic diagram illustrating flow of information in the updating step to incorporate a promotional scheme in FIG. 2.

FIG. 7 shows a schematic diagram 700 illustrating flow of information in the updating step to incorporate a promotional scheme (step 210 or 212) in FIG. 2. In one embodiment, the merchant device 302 sends the customer device 304 customer-specific information relating to his/her user profile, purchase pattern, etc. (as represented by arrow 702 in FIG. 7). For example, the customer may have an existing account with the merchant and thus qualify for a loyalty program or bonus scheme. Alternatively, the merchant can bundle related items, e.g. infant formula and baby diapers, based on an analysis of the consumer's recent purchases. In another embodiment, the merchant device 302 sends the customer device 304 generic, store-wide promotion information, such as bulk discounts for certain items, monthly/weekly special items, etc. (also represented by arrow 702). In either case, the customer can pick the applicable voucher, coupon, discount, etc., which appear as items on the customer device 304, to add to the shopping cart, and request an incremental update of the shopping cart, as described above, and represented as arrow 704 in FIG. 7. For illustration, an example pop-up message on the customer may be in the form of "You have AAA points. You can use BBB points to redeem $CCC. Add Item?"

Figure 8:
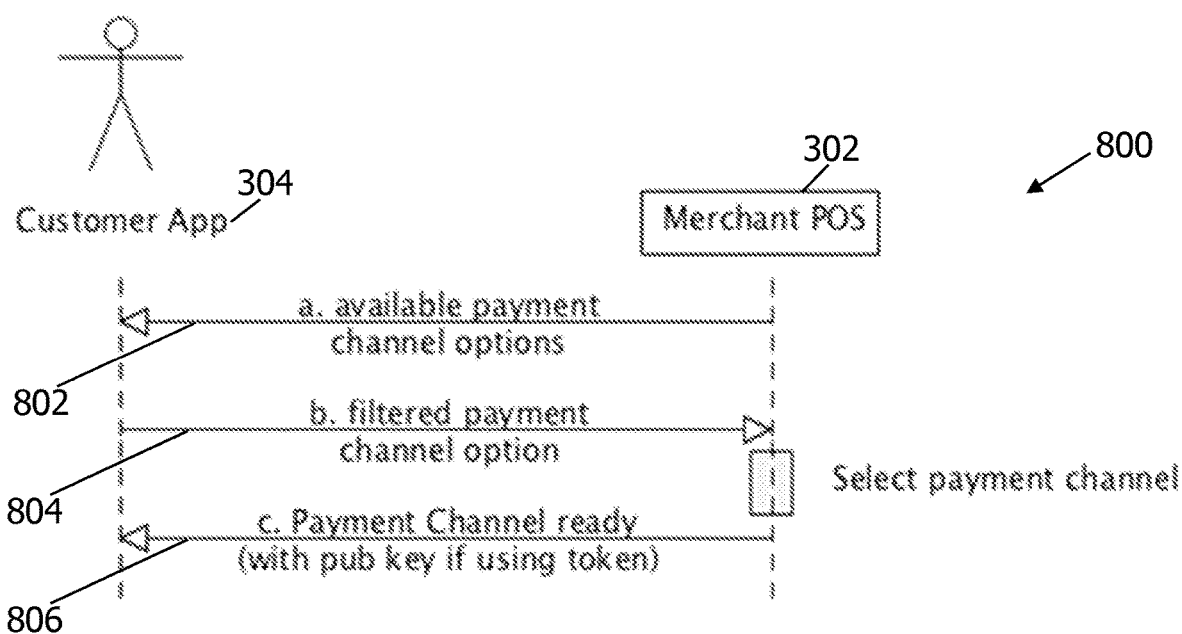
FIG. 8 shows a schematic diagram illustrating flow of information in the payment option exchange step in FIG. 2.

After the synchronisation of cart information and any cart update are completed, the merchant device 302 and customer device 304 communicate to determine the suitable payment channel. FIG. 8 shows a schematic diagram 800 illustrating flow of information in the payment option exchange step (step 214) in FIG. 2. In this step, the merchant device 302 sends the customer device 304 a list of payment channels supported by the merchant device 302 and queries which of these channels are available on the customer device 304, as represented by arrow 802 in FIG. 8. The merchant device 302 then responds with a filtered list of available payment channels, as represented by arrow 804. For example, if the customer device 304 does not have an Ethernet data connection, certain payment channels may not be applicable. The merchant can select the preferred payment channel if multiple channels are available, and the merchant device 302 informs the customer device 304 to make selected channel ready accordingly, as represented by arrow 806. If tokenized payment is selected, the merchant device can also send a public encryption key to the customer device at this point.

Figure 9A:
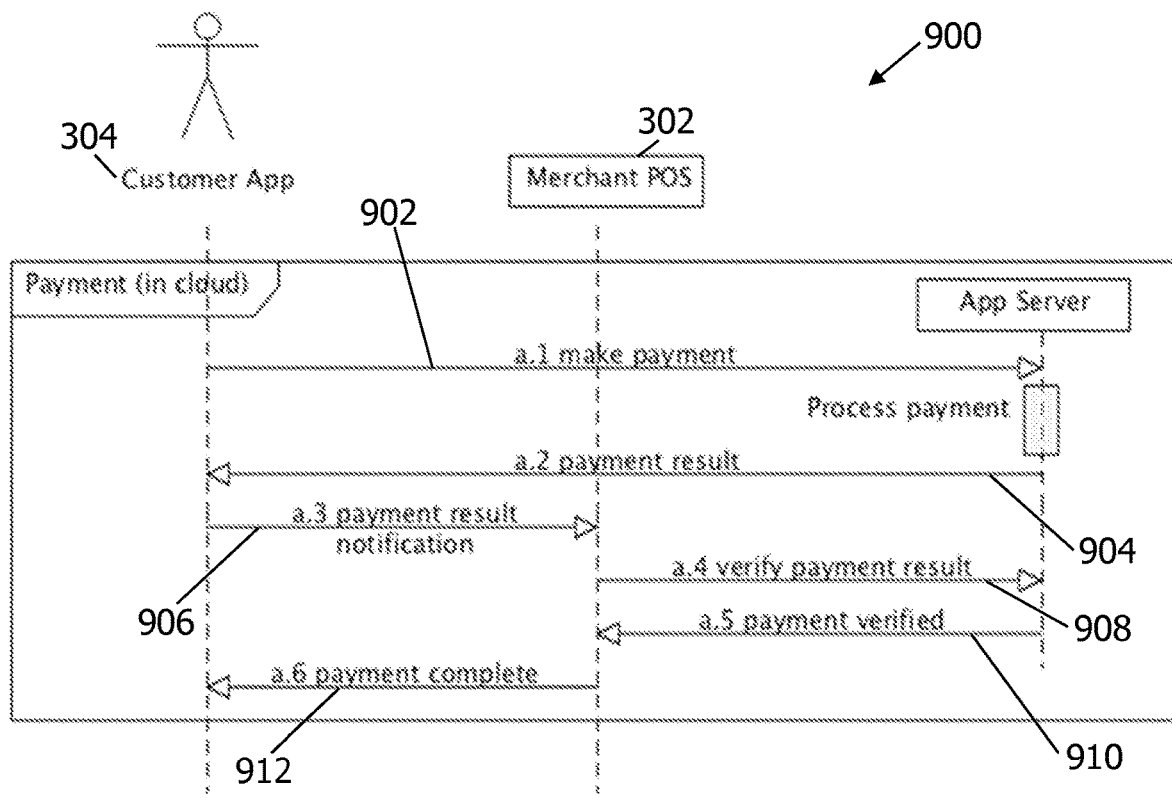
FIGS. 9A-9D show schematic diagrams illustrating flow of information in example payment modes suitable for the payment step in FIG. 2.

FIGS. 9A-9D show schematic diagrams illustrating respective flows of information in example payment modes suitable for the payment step (step 216) in FIG. 2. In FIG. 9A which shows schematic diagram 900, payment is performed via a cloud server 902. Here, the customer confirms payment, and the customer device 304 sends the relevant information including e.g. credit/debit card information, or PayPal account number, etc. to the cloud server 902, as represented by arrow 904. The cloud server 902 processes the payment, typically in conjunction with other parties in a manner understood by those skilled in the art, and provides the customer device 304 with a confirmation of the payment, as represented by arrow 906. The customer device 304 then notifies the merchant device 302 of the payment result (as represented by arrow 908), and the merchant device 302 in turn queries the cloud server 902 for confirmation (as represented by arrow 910). After receiving the verification from the cloud server 902 (as represented by arrow 912), the merchant device 302 informs the customer device 304 that the payment is completed. For illustration, a pop-up notification "Payment Completed!" or "Transaction Successful!" may appear on the customer device 304.

Figure 9B:
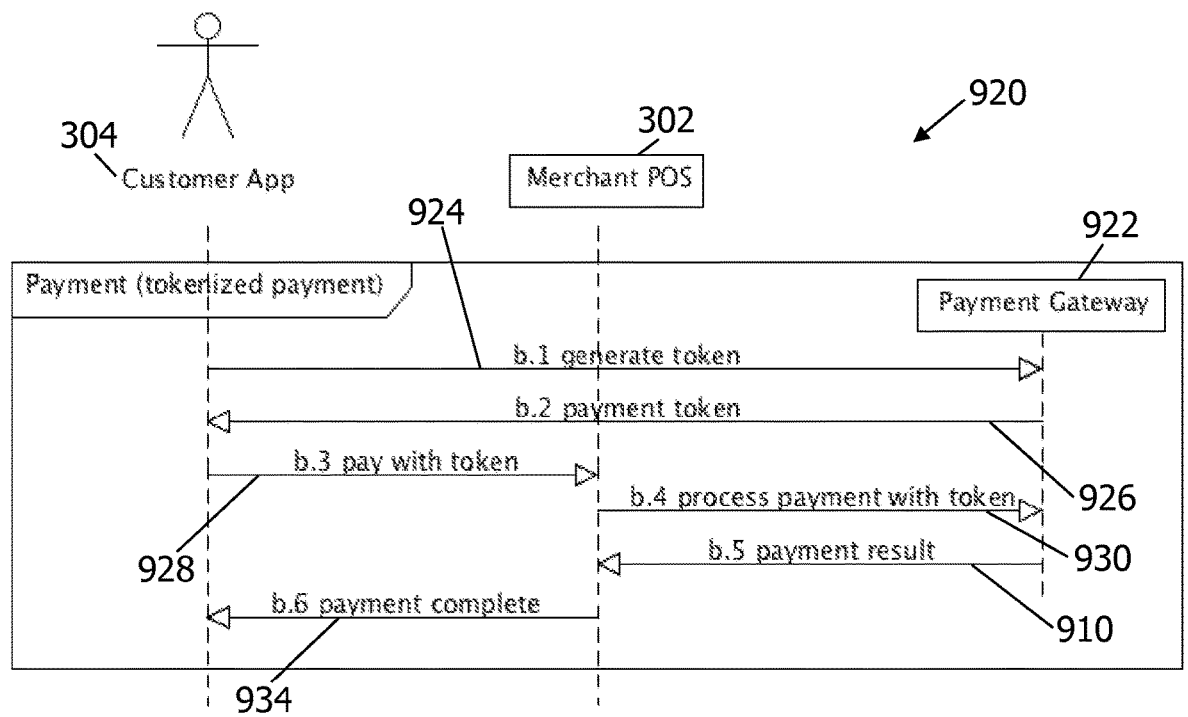

In FIG. 9B, which shows a schematic diagram 920, a tokenized payment is effected via a payment gateway 922. Here, the customer confirms payment, and the customer device 304 sends a request, together with the public encryption key previously received from the merchant device 302 (described above), to the payment gateway 922 to generate the payment token, as represented by arrow 924 in FIG. 9B. The payment gateway 922 recognises the encryption key and provides the customer device 304 with the payment token, as represented by arrow 926. The token is then used to request payment with the merchant device 302, which in turn forwards the request to the payment gateway 922, as represented by arrows 928, 930 respectively. The payment gateway 922 processes the payment, typically in conjunction with other parties in a manner understood by those skilled in the art, and provides the merchant device 302 with a confirmation of the payment, which is then forwarded to the customer device 304, as represented by arrows 932, 934 respectively. A pop-up message similar to one described above with respect to FIG. 9A may appear on the customer device 304.

Figure 9C:
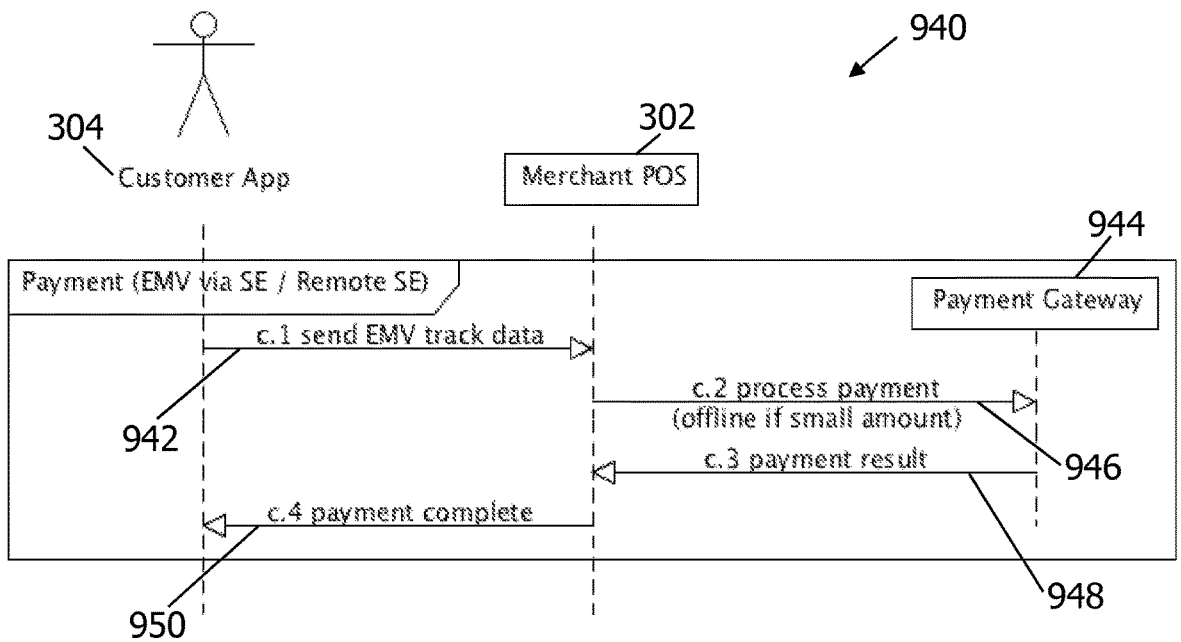

In FIG. 9C which shows a schematic diagram 940, payment is effected using an EMV chip with a secure element (SE) or remote SE. Here, the customer device 304 sends the EMV track data to the merchant device 302 via Bluetooth, as represented by arrow 942 in FIG. 9C. The merchant device 302 then sends the request for payment processing to a payment gateway 944, as represented by arrow 946. In some instances when the amount is smaller than a predetermined threshold (e.g. less than $100), the merchant device 302 may be authorised to process the payment offline without contacting the payment gateway 944. Otherwise, the payment gateway 944 processes the payment, typically in conjunction with other parties in a manner understood by those skilled in the art, and provides the merchant device 302 with a confirmation of the payment, which is then forwarded to the customer device 304, as represented by arrows 948, 950 respectively. A pop-up message similar to one described above with respect to FIG. 9A may appear on the customer device 304.

Figure 9D:
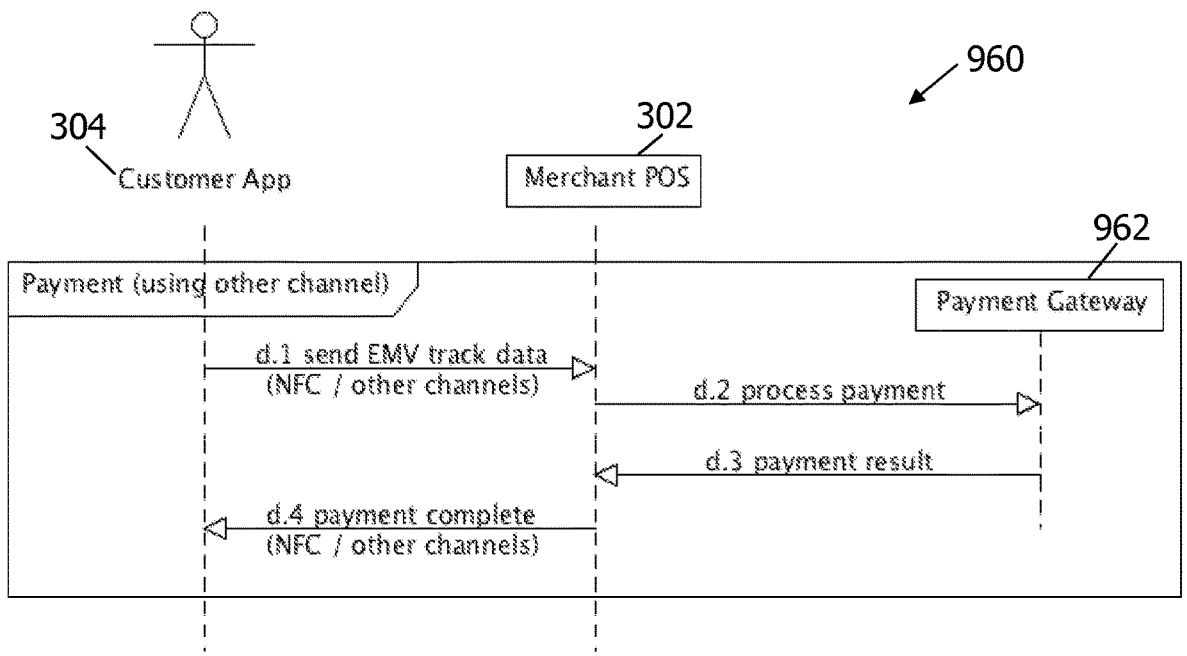

In FIG. 9D which shows a schematic diagram 960, payment is effected using EMV via another channel such as NFC. Here, the process can be initiated by tapping an NFC-supported customer device against an NFC card reader to send the EMV track data to the merchant device 302. The remaining exchanges of information between the merchant device 302, payment gateway 962 and customer device 304 in the payment process are substantially similar to those described above with respect to FIG. 9C.

For completeness, it will be appreciated that, as a back-up option, payment can also be made manually in cash, instead of the electronic or card payment modes already discussed. In that case, the merchant device 302 can still send the customer device 304 a notification that the payment is completed. In other words, the customer device 304 still receives an electronic payment receipt, independent of the payment mode used, and the receipt can be stored or printed as desired.

Figure 10:
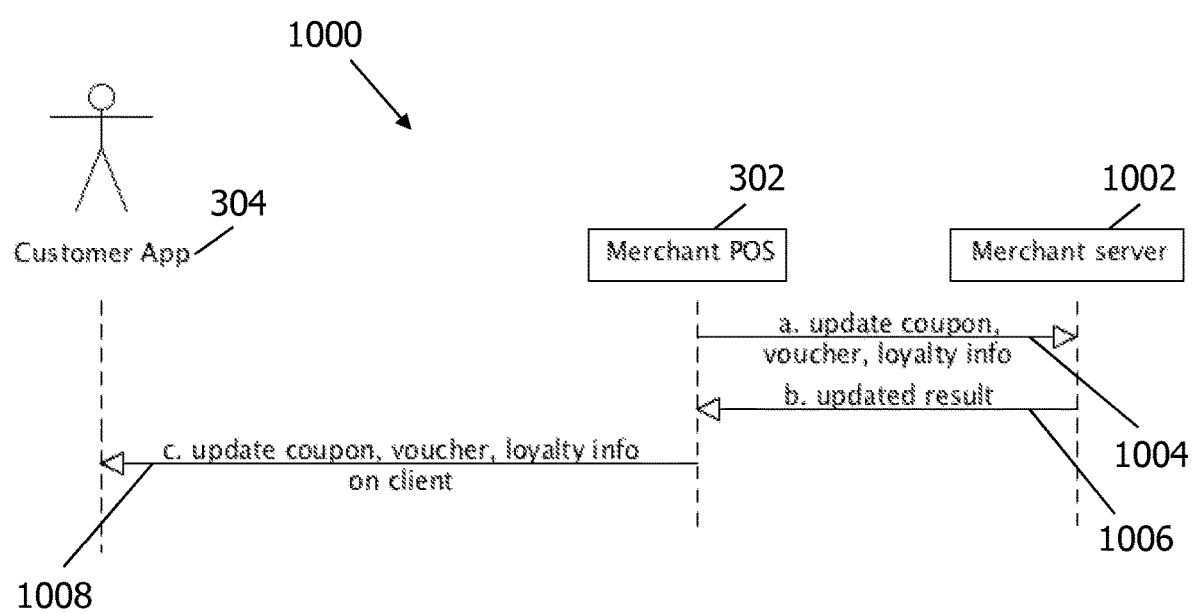
FIG. 10 shows a schematic diagram illustrating flow of information in the final updating step in FIG. 2.

To round up the transaction, a final update is made. FIG. 10 shows a schematic diagram 1000 illustrating flow of information in the final updating step (step 218) in FIG. 2. Typically, the merchant device updates a merchant server 1002 of the coupon, voucher, and/or loyalty information resulting from the transaction, as represented by arrow 1004 in FIG. 10. This information again can be customer-specific (e.g. updated number of loyalty points based on the customer profile), or generic, store-wide (e.g. number of discount/sale items of a certain category still remaining) The updated information is sent back to the merchant device 302, which may communicate with the customer device the updated coupon, voucher, and/or discount information accordingly, as represented by arrows 1006, 1008 respectively. In one example, the customer may be informed of a coupon or voucher that he can use as a returning customer in the next transaction. For illustration, in another example, the customer may be updated with a message "You now have DDD loyalty points in your account."

Figure 11:
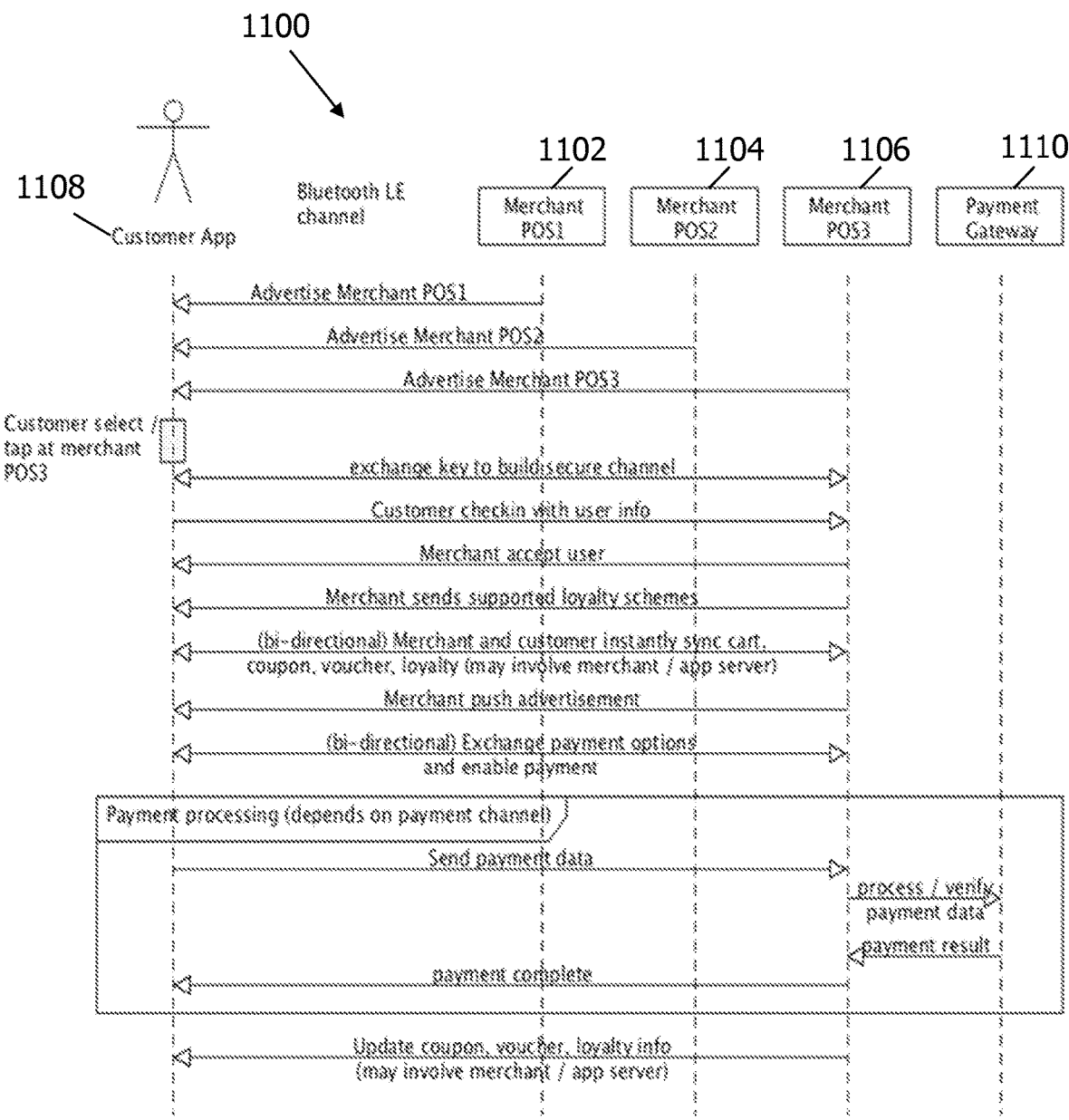
FIG. 11 shows a schematic diagram summarizing the hardware for implementing the method of FIG. 2.

FIG. 11 shows a schematic diagram 1100 summarizing the hardware for implementing the method of FIG. 2. As can be seen in FIG. 11 and described above, a plurality of merchant devices 1102, 1104, 1106 may simultaneously broadcast their names and availability via Bluetooth low energy. The customer can select the merchant device 1106 from the list presented to him/her on a customer device 1108, or physically tap against the selected merchant device 1106, to initiate check-in. The exchanges between the customer and merchant devices typically take place via Bluetooth low energy. At the payment processing stage, an off-site application server or payment gateway 1110 may be involved.

Figure 12:
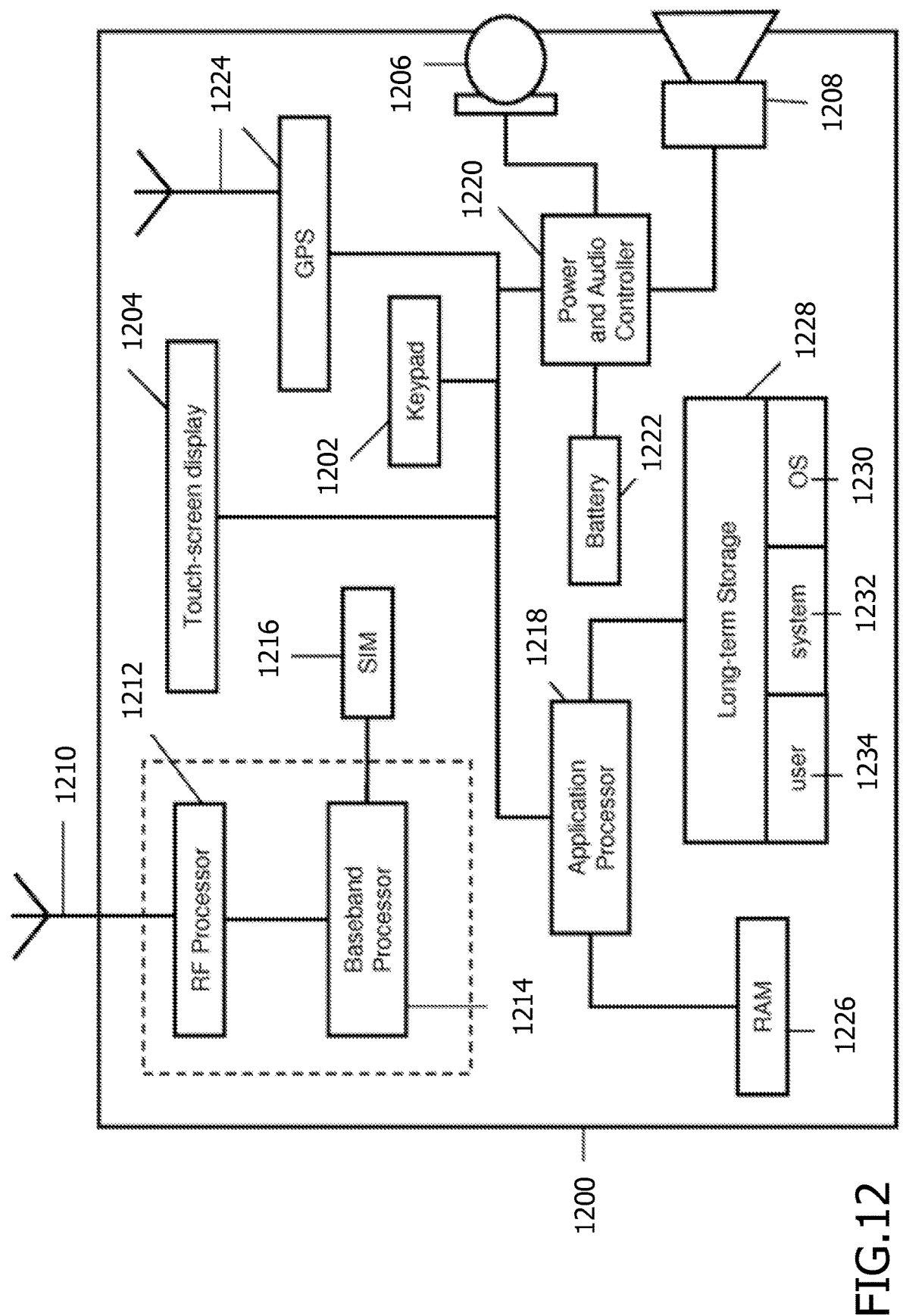
FIG. 12 shows a schematic diagram of a wireless device suitable for use in the example embodiments.

The method as described in the example embodiments can provide an efficient and hassle-free way to check out a cart of goods or services. The customer device can automatically connect to an available merchant device, allowing the customer to initiate the check-out process at his/her convenience. Advantageously, any change or update of the cart can be made instantly either by the merchant or the customer. Further, the payment process can be carried out electronically without the customer being physically at the payment counter, and electronic receipts are issued once the payment is confirmed. For example, in a restaurant setting, the customer can request and make the payment without having to leave his/her seat or request the bill from the wait staff FIG. 12 shows a schematic of an exemplary wireless computing device 1200 that may be utilized to implement the customer device (such as 302 in FIG. 3) and/or the merchant device (such as 304 in FIG. 3).

The wireless device 1200 comprises a keypad 1202, a touch-screen 1204, a microphone 1206, a speaker 1208 and an antenna 1210. The wireless device 1200 is capable of being operated by a user to perform a variety of different functions, such as, for example, hosting a telephone call, sending an SMS message, browsing the Internet, sending an email and providing satellite navigation.

The wireless device 1200 comprises hardware to perform communication functions (e.g. telephony, data communication), together with an application processor and corresponding support hardware to enable the wireless device 1200 to have other functions, such as, messaging, Internet browsing, email functions and the like. The communication hardware is represented by a radio frequency (RF) processor 1212 which provides an RF signal to the antenna 1210 for the transmission of data signals, and the receipt therefrom. Additionally provided is a baseband processor 1214, which provides signals to and receives signals from the RF Processor 1212. The baseband processor 1214 also interacts with a subscriber identity module (SIM) 1216, as is well known in the art. The communication subsystem enables the wireless device 1200 to communicate via a number of different communication protocols including 3G, 4G, GSM, WiFi, Bluetooth™ and/or CDMA. The communication subsystem of the wireless device 1200 is beyond the scope of the disclosure.

The keypad 1202 and the touch-screen 1204 are controlled by an application processor 1218. A power and audio controller 1220 is provided to supply power from a battery 1222 to the communication subsystem, the application processor 1218, and the other hardware. The power and audio controller 1220 also controls input from the microphone 1206, and audio output via the speaker 1208. Also provided is a global positioning system (GPS) antenna and associated receiver element 1224 which is controlled by the application processor 1218 and is capable of receiving a GPS signal for use with a satellite navigation functionality of the wireless device 1200.

In order for the application processor 1218 to operate, various different types of memory are provided. Firstly, the wireless device 1200 includes Random Access Memory (RAM) 1226 connected to the application processor 1218 into which data and program code can be written and read from at will. Code placed anywhere in RAM 1226 can be executed by the application processor 1218 from the RAM 1226. RAM 1226 represents a volatile memory of the wireless device 1200.

Secondly, the wireless device 1200 is provided with a long-term storage 1228 connected to the application processor 1218. The long-term storage 1228 comprises three partitions, an operating system (OS) partition 1230, a system partition 1232 and a user partition 1234. The long-term storage 1228 represents a non-volatile memory of the wireless device 1200.

In the present example, the OS partition 1230 contains the firmware of the wireless device 1200 which includes an operating system. Other computer programs may also be stored on the long-term storage 1228, such as application programs (also referred to as apps), and the like. In particular, application programs which are mandatory to the wireless device 1200, such as, in the case of a smartphone, communications applications and the like are typically stored in the system partition 1232. The application programs stored on the system partition 1232 would typically be those which are bundled with the wireless device 1200 by the device manufacturer when the wireless device 1200 is first sold.

Application programs which are added to the wireless device 1200 by the user would usually be stored in the user partition 1234.

As stated, the representation of FIG. 12 is schematic. In practice, the various functional components illustrated may be substituted into one and the same component. For example, the long-term storage 1228 may comprise NAND flash, NOR flash, a hard disk drive or a combination of these.

Figure 13:
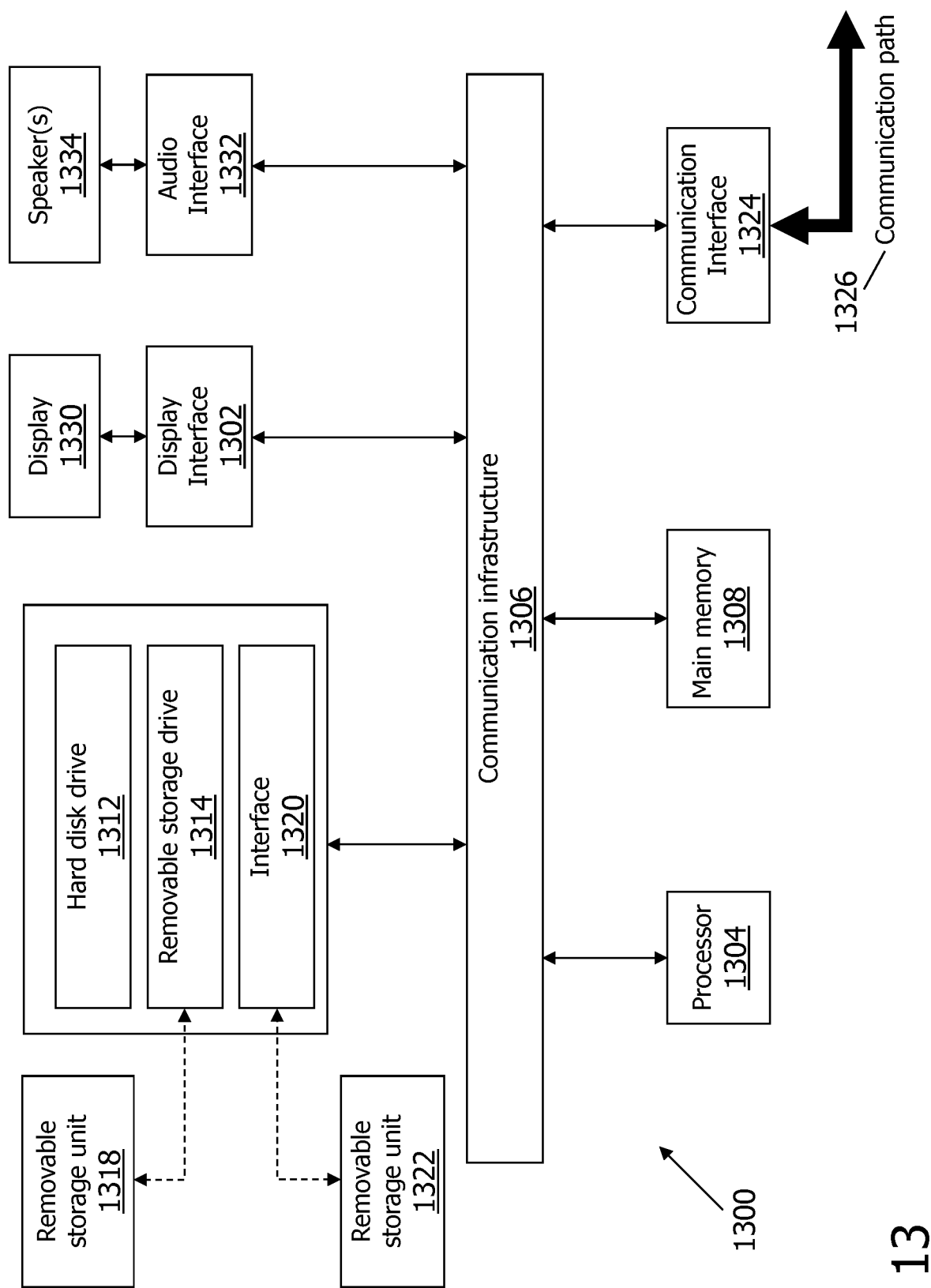
FIG. 13 shows a schematic diagram of a computer system suitable for use in the example embodiments.

FIG. 13 depicts an exemplary computing device 1300, hereinafter interchangeably referred to as a computer system 1300, where one or more such computing devices 1300 may be used for the cloud server 902, the merchant server 1002, or part of the payment gateway 922, 944, 1110. The following description of the computing device 1300 is provided by way of example only and is not intended to be limiting.

As shown in FIG. 13, the example computing device 1300 includes a processor 1304 for executing software routines. Although a single processor is shown for the sake of clarity, the computing device 1300 may also include a multi-processor system. The processor 1304 is connected to a communication infrastructure 1306 for communication with other components of the computing device 1300. The communication infrastructure 1306 may include, for example, a communications bus, cross-bar, or network.

The computing device 1300 further includes a main memory 1308, such as a random access memory (RAM), and a secondary memory 1310. The secondary memory 1310 may include, for example, a hard disk drive 1312 and/or a removable storage drive 1314, which may include a floppy disk drive, a magnetic tape drive, an optical disk drive, or the like. The removable storage drive 1314 reads from and/or writes to a removable storage unit 1318 in a well-known manner. The removable storage unit 1318 may include a floppy disk, magnetic tape, optical disk, or the like, which is read by and written to by removable storage drive 1314. As will be appreciated by persons skilled in the relevant art(s), the removable storage unit 1318 includes a computer readable storage medium having stored therein computer executable program code instructions and/or data.

In an alternative implementation, the secondary memory 1310 may additionally or alternatively include other similar means for allowing computer programs or other instructions to be loaded into the computing device 1300. Such means can include, for example, a removable storage unit 1322 and an interface 1320. Examples of a removable storage unit 1322 and interface 1320 include a program cartridge and cartridge interface (such as that found in video game console devices), a removable memory chip (such as an EPROM or PROM) and associated socket, and other removable storage units 1322 and interfaces 1320 which allow software and data to be transferred from the removable storage unit 1322 to the computer system 1300.

The computing device 1300 also includes at least one communication interface 1324. The communication interface 1324 allows software and data to be transferred between computing device 1300 and external devices via a communication path 1326. In various embodiments, the communication interface 1324 permits data to be transferred between the computing device 1300 and a data communication network, such as a public data or private data communication network. The communication interface 1324 may be used to exchange data between different computing devices 1300 which such computing devices 1300 form part an interconnected computer network. Examples of a communication interface 1324 can include a modem, a network interface (such as an Ethernet card), a communication port, an antenna with associated circuitry and the like. The communication interface 1324 may be wired or may be wireless. Software and data transferred via the communication interface 1324 are in the form of signals which can be electronic, electromagnetic, optical or other signals capable of being received by communication interface 1324. These signals are provided to the communication interface via the communication path 1326.

As shown in FIG. 13, the computing device 1300 further includes a display interface 1302 which performs operations for rendering images to an associated display 1330 and an audio interface 1332 for performing operations for playing audio content via associated speaker(s) 1334.

As used herein, the term "computer program product" may refer, in part, to removable storage unit 1318, removable storage unit 1322, a hard disk installed in hard disk drive 1312, or a carrier wave carrying software over communication path 1326 (wireless link or cable) to communication interface 1324. Computer readable storage media refers to any non-transitory tangible storage medium that provides recorded instructions and/or data to the computing device 1300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 1300. Examples of transitory or non-tangible computer readable transmission media that may also participate in the provision of software, application programs, instructions and/or data to the computing device 1300 include radio or infra-red transmission channels as well as a network connection to another computer or networked device, and the Internet or Intranets including e-mail transmissions and information recorded on Websites and the like.

The computer programs (also called computer program code) are stored in main memory 1308 and/or secondary memory 1310. Computer programs can also be received via the communication interface 1324. Such computer programs, when executed, enable the computing device 1300 to perform one or more features of embodiments discussed herein. In various embodiments, the computer programs, when executed, enable the processor 1304 to perform features of the above-described embodiments. Accordingly, such computer programs represent controllers of the computer system 1300.

Software may be stored in a computer program product and loaded into the computing device 1300 using the removable storage drive 1314, the hard disk drive 1312, or the interface 1320. Alternatively, the computer program product may be downloaded to the computer system 1300 over the communications path 1326. The software, when executed by the processor 1304, causes the computing device 1300 to perform functions of embodiments described herein.

It is to be understood that the embodiment of FIG. 13 is presented merely by way of example. Therefore, in some embodiments one or more features of the computing device 1300 may be omitted. Also, in some embodiments, one or more features of the computing device 1300 may be combined together. Additionally, in some embodiments, one or more features of the computing device 1300 may be split into one or more component parts.

It will be appreciated that the elements illustrated in FIG. 13 function to provide means for performing the various functions and operations of the servers as described in the above embodiments.

In an implementation, a server may be generally described as a physical device comprising at least one processor and at least one memory including computer program code. The at least one memory and the computer program code are configured to, with the at least one processor, cause the physical device to perform the requisite operations.

The resulting technical effect achieved by the systems and methods described herein may include at least one of: (i) establishing a secure wireless connection between a merchant device and a customer device; (ii) synchronizing a shopping cart of the customer between the merchant and the customer devices; (iii) determining at least one payment option for checking out the shopping cart; and (iv) processing a payment associated with the shopping cart based on a selected payment option out of the at least one payment option.

It will be appreciated by a person skilled in the art that numerous variations and/or modifications may be made to the present invention as shown in the specific embodiments without departing from the spirit or scope of the invention as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

What is claimed is:

1. A method for conducting a transaction between a merchant and a customer, the method comprising:

broadcasting, from a merchant device to a customer device, information identifying the merchant device while the merchant device and the customer device are both located at a physical merchant location to cause the broadcast information to be displayed on the customer device, wherein the merchant device includes one or more point of sale (POS) terminals;

receiving, at the merchant device from the customer device, a connection request to initiate a connection between the merchant device and the customer device;

in response to the received connection request, exchanging encryption keys between the merchant device and the customer device to establish a secure wireless channel between the merchant device and the customer device;

receiving, over the secure wireless channel, at the merchant device, a check-in request from the customer device, the check-in request including information identifying the customer;

prompting the merchant to accept the check-in request by displaying a message on the merchant device;

accepting, at the merchant device, the check-in request based on an input made by the merchant on the merchant device in response to the displayed message;

generating, as a result of acceptance of the check-in request, cart information of the customer at the merchant device, the cart information generated based on data inputted by the merchant into the merchant device, the cart information representing details of items being purchased;

transmitting, by the merchant device, the cart information to the customer device to cause the cart information to be displayed on the customer device prior to initiating a payment process for the items and while the customer device is located at the physical merchant location, and to cause the cart information to be synchronized in real-time between the merchant device and the customer device while the customer is present at the physical merchant location;

sending, from the merchant device, a cart update to the customer device, wherein the cart update corrects an error in the cart information, the error caused by at least one of a duplicate entry of an item and an erroneous entry of an item entered by the merchant;

receiving, at the merchant device from the customer device, a cart update acknowledgement indicating that the cart information was corrected on the customer device;

receiving, from the customer device at the merchant device, a cart lock request generated at the customer device such that the merchant device temporarily stops the real-time synchronization of the cart information between the merchant device and the customer device;

transmitting, in response to temporarily stopping the real-time synchronization, a cart lock acknowledgement from the merchant device to the customer device;

receiving, from the customer device at the merchant device, a cart update, wherein the cart update indicates an addition or removal of an item from the cart information;

sending, from the merchant device to the customer device, a cart update acknowledgement;

receiving, from the customer device at the merchant device, a cart unlock confirmation generated at the customer device;

resuming, by the merchant device, the real-time synchronization of the cart information in response to the cart unlock confirmation received from the customer device;

determining, via the secure wireless channel, at least one payment option for checking out the items corresponding to the cart information; and processing, over the secure wireless channel established between the merchant device and the customer device, a payment associated with the cart information based on a selected payment option out of the at least one payment option.

2. The method as claimed in claim 1, wherein the secure wireless channel comprises a Bluetooth low energy connection.

3. The method as claimed in claim 1, wherein the check-in request includes at least one of an alphanumeric string, a sound, an icon, and a picture associated with the customer.

4. The method as claimed in claim 1, wherein the check-in request is automatically received in response to the customer device being positioned proximate the merchant device.

5. The method as claimed in claim 1, wherein transmitting the cart information comprises:

receiving, from the customer device at the merchant device, a request for the cart information;

transmitting, by the merchant device to the customer device, the cart information in response to the request; and receiving, from the customer device at the merchant device, a cart update acknowledgement that indicates that the customer device received the cart information.

6. The method as claimed in claim 1, wherein the item is at least one of a voucher, a coupon, a discount, and loyalty points that appears on the customer device in connection with a loyalty program.

7. The method as claimed in claim 1, wherein the method further comprises broadcasting promotional information from the merchant device to the customer device.

8. The method as claimed in claim 7, wherein the promotional information is specific to the customer.

9. The method as claimed in claim 1, wherein the at least one payment option includes at least one of the following: payment in cloud, tokenized payment, and payment by an EMV enabled chip.

10. The method as claimed in claim 1, wherein processing the payment comprises communicating with an off-site transaction processing device.

11. A merchant device for conducting a transaction between a merchant and a customer, the merchant device configured to:

broadcast information identifying the merchant device to a customer device while the merchant device and the customer device are both located at a physical merchant location to cause the broadcast information to be displayed on the customer device, wherein the merchant device includes one or more point of sale (POS) terminals;

receive, from the customer device, a connection request to initiate a connection between the merchant device and the customer device;
in response to the received connection request, exchange encryption keys with the customer device to establish a secure wireless channel between the merchant device and the customer device;
receive, over the secure wireless channel, a check-in request from the customer device, the check-in request including information identifying the customer;
prompt the merchant to accept the check-in request by displaying a message on the merchant device;
accept the check-in request based on an input made by the merchant on the merchant device in response to the displayed message;
generate, as a result of acceptance of the check-in request, cart information of the customer, the cart information generated based on data inputted by the merchant into the merchant device, the cart information representing details of items being purchased;
transmit, by the merchant device, the cart information to the customer device to cause the cart information to be displayed on the customer device prior to initiating a payment process for the items and while the customer device is located at the physical merchant location, and to cause the cart information to be synchronized in real-time between the merchant device and the customer device while the customer is present at the physical merchant location;
send, from the merchant device, a cart update to the customer device, wherein the cart update corrects an error in the cart information, the error caused by at least one of a duplicate entry of an item and an erroneous entry of an item entered by the merchant;
receive, at the merchant device from the customer device, a cart update acknowledgement indicating that the cart information was corrected on the customer device;
receive, from the customer device at the merchant device, a cart lock request generated at the customer device such that the merchant device temporarily stops the real-time synchronization of the cart information between the merchant device and the customer device;
transmit, in response to temporarily stopping the real-time synchronization, a cart lock acknowledgement from the merchant device to the customer device;
receive, from the customer device at the merchant device, a cart update, wherein the cart update indicates an addition or removal of an item from the cart information;
send, from the merchant device to the customer device, a cart update acknowledgement;
receive, from the customer device at the merchant device, a cart unlock confirmation generated at the customer device;
resume, by the merchant device, the real-time synchronization of the cart information in response to the cart unlock confirmation received from the customer device;
determine, via the secure wireless channel, at least one payment option for checking out the items corresponding to the cart information; and
facilitate, over the secure wireless channel established between the merchant device and the customer device, processing of a payment associated with the cart information based on a selected payment option out of the at least one payment option.

12. A computer storage medium having stored thereon computer code means to instruct a merchant device to execute a method for conducting a transaction between a merchant and a customer, the method comprising:
broadcasting, from the merchant device to a customer device, information identifying the merchant device while the merchant device and the customer device are both located at a physical merchant location to cause the broadcast information to be displayed on the customer device, wherein the merchant device includes one or more point of sale (POS) terminals;
receiving, at the merchant device from the customer device, a connection request to initiate a connection between the merchant device and the customer device;
in response to the received connection request, exchanging encryption keys between the merchant device and the customer device to establish a secure wireless channel between the merchant device and the customer device;
receiving, over the secure wireless channel, at the merchant device, a check-in request from the customer device, the check-in request including information identifying the customer;
prompting the merchant to accept the check-in request by displaying a message on the merchant device;
accepting, at the merchant device, the check-in request based on an input made by the merchant on the merchant device in response to the displayed message;
generating, as a result of acceptance of the check-in request, cart information of the customer at the merchant device, the cart information generated based on data inputted by the merchant into the merchant device, the cart information representing details of items being purchased;
transmitting, by the merchant device, the cart information to the customer device to cause the cart information to be displayed on the customer device prior to initiating a payment process for the items and while the customer device is located at the physical merchant location, and to cause the cart information to be synchronized in real-time between the merchant device and the customer device while the customer is present at the physical merchant location;
sending, from the merchant device, a cart update to the customer device, wherein the cart update corrects an error in the cart information, the error caused by at least one of a duplicate entry of an item and an erroneous entry of an item entered by the merchant;
receiving, at the merchant device from the customer device, a cart update acknowledgement indicating that the cart information was corrected on the customer device;
receiving, from the customer device at the merchant device, a cart lock request generated at the customer device such that the merchant device temporarily stops the real-time synchronization of the cart information between the merchant device and the customer device;
transmitting, in response to temporarily stopping the real-time synchronization, a cart lock acknowledgement from the merchant device to the customer device;
receiving, from the customer device at the merchant device, a cart update, wherein the cart update indicates an addition or removal of an item from the cart information;
sending, from the merchant device to the customer device, a cart update acknowledgement;

receiving, from the customer device at the merchant device, a cart unlock confirmation generated at the customer device;

resuming, by the merchant device, the real-time synchronization of the cart information in response to the cart unlock confirmation received from the customer device;

determining, via the secure wireless channel, at least one payment option for checking out the items corresponding to the cart information; and processing, over the secure wireless channel established between the merchant device and the customer device, a payment associated with the cart information based on a selected payment option out of the at least one payment option.

13. The computer storage medium as claimed in claim 12, wherein the secure wireless channel is a Bluetooth low energy connection.

14. The method as claimed in claim 1, wherein the determining at least one payment option comprises:

transmitting, from the merchant device to the customer device, a list of payment options supported by the merchant device;

receiving, from the merchant device at the customer device, a filtered list of payment options supported by the merchant device and the customer device;

selecting, using the merchant device, the selected payment option from the filtered list; and transmitting, from the merchant device to the customer device, a message requesting the customer device initiate payment using the selected payment option.

15. The method as claimed in claim 1 further comprising:

broadcasting, from each of the one or more POS terminals to the customer device, information identifying the respective POS terminal; and receiving, from the customer device, at one POS terminal, the connection request to initiate the connection between the merchant device and the customer device, the connection request including a request by the customer device to connect to the one POS terminal instead of the remaining POS terminals.

* * * * *